United States Patent [19]
Smith et al.

[11] Patent Number: 5,908,557
[45] Date of Patent: Jun. 1, 1999

[54] PROCESS FOR THE REMOVAL OF PENTAVALENT ARSENIC FROM WATER

[75] Inventors: Paul K. Smith, Roscoe; Eugene P. Bergemann, Hoffmann Estates, both of Ill.

[73] Assignee: NTEC Solutions, Inc., Mt. Prospect, Ill.

[21] Appl. No.: 08/854,834

[22] Filed: May 12, 1997

[51] Int. Cl.⁶ ............................... B01D 15/00; C02F 1/28
[52] U.S. Cl. ..................... 210/668; 210/669; 210/670; 210/683; 210/758; 210/911
[58] Field of Search ..................... 210/668, 669, 210/670, 681, 683, 684, 688, 758, 911, 912; 528/423

[56] References Cited

U.S. PATENT DOCUMENTS

| | | | |
|---|---|---|---|
| 3,923,665 | 12/1975 | Lambert et al. | 210/501 |
| 4,187,183 | 2/1980 | Hatch | 210/501 |
| 4,221,871 | 9/1980 | Meitzner et al. | 521/29 |
| 4,224,415 | 9/1980 | Meitzner et al. | 521/38 |
| 4,256,840 | 3/1981 | Meitzner et al. | 521/33 |
| 4,382,124 | 5/1983 | Meitzner et al. | 521/38 |
| 4,999,190 | 3/1991 | Fina et al. | 424/79 |
| 5,591,346 | 1/1997 | Etzel et al. | 210/911 |

OTHER PUBLICATIONS

Domb, Abraham and Anvy, Yair, *J. Macromol. Sci.*, A22 (2) pp. 177–181, (1985).

Vance, David B., *The National Enviromental Journal*, (May/Jun. 1995), pp. 59–64.

Frey, Michelle M. et al., National Compliance Assessment and Costs for the Regulation of Arsenic in Drinking Water, University of Colorado at Boulder (Jan. 7, 1997).

*Primary Examiner*—Ivars Cintins
*Attorney, Agent, or Firm*—Welsh & Katz, Ltd.

[57] ABSTRACT

A process for the separation of pentavalent arsenic from an aqueous solution using an N-alkyl pyridinium-containing adsorption medium is disclosed. An oxidizing medium and process for the oxidation of trivalent arsenic to pentavalent arsenic with removal of the pentavalent arsenic so formed is also disclosed.

9 Claims, No Drawings

5,908,557

PROCESS FOR THE REMOVAL OF PENTAVALENT ARSENIC FROM WATER

TECHNICAL FIELD

This invention pertains to a process for removing an environmentally hazardous contaminant from aqueous solutions. More particularly, the present invention relates to an efficient affinity process for the selective removal of arsenic from pentavalent arsenic-containing aqueous solutions. The present invention also relates to a process for converting trivalent arsenic to pentavalent arsenic before separation of the pentavalent arsenic, thereby facilitating removal of the arsenic.

BACKGROUND OF THE INVENTION

Arsenic in drinking water is designated as a priority contaminant in the United States of America under the 1986 Safe Drinking Water Act and amendments thereto. Since 1974, an arsenic Maximum Contaminant Level (MCL) of 50 parts per billion (ppb) has been in effect in the United States. As a result of more recent findings pertaining to health risks associated with populations exposed to high concentrations of arsenic in drinking water, the United States Environmental Protection Agency (EPA) recommends the lowering of the MCL for arsenic from 50 ppb to 2 ppb. In the United States alone, more than 12,000 public water utilities would fail to meet the more stringent proposed arsenic standard. One estimate places the cost of compliance for the 2 ppb MCL proposal in excess of $5 billion/year.

The number of private wells in the United States that fail to meet the existing 50 ppb or proposed 2 ppb MCL for arsenic is unknown. It is believed that in many areas in the USA, many thousands of private wells produce drinking water with potential, serious health risks for the households depending on self-produced water because of arsenic contamination.

Regionally, high arsenic content in drinking water is a global problem. In West Bengal, India, for example, an estimated 200,000 people currently suffer from arsenic-induced skin lesions, some of which have advanced to pre-cancerous hyperkeratoses.

Arsenic is found in several oxidation states. Typically, arsenic is present in aqueous solutions in the oxidation state of plus five ($As^{+5}$, pentavalent) and to a lesser extent the oxidation state of plus three ($As^{+3}$, trivalent). There is no significant reported cation chemistry for arsenic, but organic arsenic salts are known for both oxidation states (e.g. $K[As(C_6H_4O_2)_2]$).

Examples of trivalent arsenic compounds are the halides ($AsCl_3$, $AsCl_2^+$, and $AsF_3$). The halides are readily hydrolyzed to arsenious acid ($H_3AsO_3$) or it acid-dissociated forms ($HAsO_2^{2-}$). The oxide form is $As_2O_3$. The trivalent arsenic compounds to be separated from aqueous solutions, most likely in an ionized form of $H_3AsO_3$, in a process of the invention are collectively referred to herein as "trivalent arsenic".

$As^0$ can be oxidized by concentrated nitric acid to pentavalent arsenic as arsenic acid (isolable as $H_3AsO_4 \cdot \frac{1}{2}H_2O$), which is a moderately strong oxidizing agent in solution. The corresponding halides are also known (e.g. $AsCl_5$, $AsCl_4^+$). The pentavalent arsenic compounds to be separated from aqueous solutions, most likely an ionized form of $H_3AsO_4$, in a process of the invention are collectively referred to herein as "pentavalent arsenic".

Surveys taken of drinking water around the world usually give a total arsenic level and fail to distinguish contributions from pentavalent arsenic or trivalent arsenic, even though trivalent arsenic is considerably more toxic than pentavalent arsenic. The failure to distinguish the valence of arsenic present in drinking water further confuses the logical assignment of MCL values because although a level of 2 ppb of pentavalent arsenic may cause no deleterious health effects, an equivalent level of trivalent arsenic can have negative health consequences.

There is an urgent need for a technology that will remove arsenic from drinking water to provide safe levels regardless of the oxidation state of the arsenic in an efficient, economical and environmentally sound manner. It is desirable that such technology be flexible and sufficiently robust in order to address the requirements of large municipal water utilities, private wells in developed countries and contaminated water sources in undeveloped countries.

A number of technologies have been described in the prior art to remove arsenic from drinking water. These technologies of the art include co-precipitation, alumina adsorption and classical ion-exchange with anion exchange resins. In a report entitled "National Compliance Assessment and Costs for the Regulation of Arsenic in Drinking Water" (January, 1997) prepared by the University of Colorado at Boulder, more than a dozen putative methods are evaluated for arsenic removal efficiency and cost. None of the evaluated methods described exhibited arsenic removal efficiencies greater than 95 percent, nor do the prior art methods offer the simplicity of use required for private well treatment or for underdeveloped areas of the world where reliable electrical power is unavailable.

Moreover, the prior art does not offer an environmentally sound "closure" to the arsenic removal problem. For instance, in situ precipitation with iron hydroxide has been shown to be moderately effective in removing certain arsenic species. A problem that remains from such a technology is the mechanical problem of filtering the iron oxide/arsenic co-precipitate from the water, and ultimately, the problem of disposing of arsenic-laden sludge which can re-leach into the same or different water supply. Much the same criticism can be made of the prior art methods of alum co-precipitation, lime precipitation or alumina adsorption.

Classical ion-exchange with anionic resins of the art suffer from poor efficiency (90 percent), low capacity (1500 bed volumes) and severe reduction in capacity and binding efficiency when competing ions such as sulfate are present in amounts of 50 ppm or more. Classical ion-exchange media suffer from poor longevity when challenged with a matrix of hard well water. It is estimated by the aforementioned Colorado report that 25 percent of such classical resins would have to be replaced on an annual basis.

There remains, therefore, a need for a simple-to-use adsorbent for removing dissolved arsenic from water that exhibits an arsenic removal efficiency greater than 95 percent that is stable and reusable.

BRIEF SUMMARY OF THE INVENTION

In accordance with the present invention, pentavalent arsenic can be efficiently and economically removed from an aqueous solution to levels of less than 2 parts per billion. Further, as described herein, the separation resin can be easily regenerated in the column providing an equally effective regenerated pentavalent arsenic separation medium. In addition, a process is described herein for the efficient and economical removal of trivalent arsenic from an aqueous solution. Further, an oxidation resin is described that can be used to convert trivalent arsenic to pentavalent arsenic.

The present invention successfully uses pentavalent arsenic binding to an adsorption medium containing a plurality of $C_1-C_4$ N-alkyl pyridinium moieties or groups and demonstrates that the adsorption medium has an unexpectedly high affinity for pentavalent arsenic. A contemplated $C_1-C_4$ N-alkyl pyridinium group has the following molecular formula:

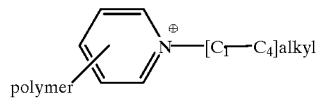

A contemplated process for reducing the concentration of pentavalent arsenic in an aqueous solution includes providing a vessel containing a water-insoluble adsorption medium having a plurality of pyridyl-containing moieties present as polymerized 2- or 4-vinyl $C_1-C_4$ N-alkyl pyridinium moieties, and preferably N-methyl pyridinium moieties, as adsorption sites. An influent of an aqueous solution having an initial total pentavalent arsenic concentration of greater than about 2 parts per billion is introduced to the vessel to contact the insoluble adsorption medium.

The solution is maintained in contact with the insoluble adsorption medium for a period of time sufficient for the adsorption sites to bind to pentavalent arsenic in the influent solution and form medium-bound arsenic and an aqueous composition. That aqueous composition is subsequently discharged from the vessel as an effluent that contains significantly less pentavalent arsenic, at least about 95 percent less.

A contemplated process for reducing the concentration of trivalent arsenic in an aqueous solution includes providing a vessel containing a water-insoluble oxidation medium having a plurality of pyridyl-containing moieties present as polymerized 2- or 4-vinyl $C_1-C_4$ N-alkyl pyridinium moieties, and preferably N-methyl pyridinium moieties, complexed with $I3^-$ as oxidizing sites. An influent of an aqueous solution having trivalent arsenic is introduced to the vessel to contact the insoluble oxidizing medium.

The solution is maintained in contact with the insoluble oxidizing medium for a period of time sufficient for the oxidizing sites to react with the trivalent arsenic in the influent solution and form pentavalent arsenic in an oxidized aqueous solution. The pentavalent arsenic concentration is reduced by contact with an adsorption medium containing N-alkyl pyridinium moieties, as described above.

Advantageously, the water contaminated with arsenic and subjected to a process described herein is within acceptable parameters for the proposed environmental safety with respect to the arsenic content (MCL=2 ppb). Specifically, the present invention unexpectedly and surprisingly demonstrates that a water-insoluble polymerized $C_1-C_4$ N-alkyl pyridinium-containing polymeric resin utilized as an arsenic adsorption medium is able to separate pentavalent arsenic from water at a high efficiency such that the pentavalent arsenic concentration in the water after contacting the adsorption medium is less than about 2 ppb.

The present invention has several benefits and advantages.

One benefit of the invention is that an adsorbent of the invention has a high capacity for the arsenic such that thousands of volumes of water can be treated per volume of adsorbent.

An advantage of the invention is that a process of the invention exhibits specificity for pentavalent arsenic removal without seriously altering the concentration of other naturally present elements that can impart desirable qualities to the water.

Another benefit of the invention is that the process has a good efficiency for arsenic removal such that greater than 99 percent of pentavalent arsenic can be removed from the treated water.

Another advantage of the invention is that the adsorption medium used in the process has the ability to be efficiently stripped on demand of adsorbed arsenic such that the volume of stripped arsenic represents a very small fraction (less than 1/1000) of the volume of water treated.

Another benefit of the invention is that the adsorbent used in the process has the ability to be reused hundreds of times without loss of capacity or efficiency.

Another advantage of the invention is that the materials required for the process are commercially available.

Yet another benefit of the invention is that the adsorbent used in the process is physically and chemically robust and can withstand multiple stripping and reuse cycles without dissolving, disintegrating or being chemically altered.

Yet another advantage of the invention is that the process permits for rapid, simple, economical treatment of water on any scale in any location in the world.

Still further benefits and advantages of the invention will be apparent to the skilled worker from the disclosure that follows.

DETAILED DESCRIPTION OF THE INVENTION

The present invention is directed to a process for removing objectionable levels of pentavalent and trivalent arsenic from an aqueous solution also containing other ions. Such a process is used for reducing the level of arsenic in an aqueous solution. The arsenic can be recovered therefrom in a more concentrated solution for use or safe disposal.

Typically, in order to reduce the arsenic concentration of drinking water to legally acceptable levels, the arsenic MCL should be at or below 50 parts per billion (ppb), and preferably at or below 2 ppb.

Processes for reducing the concentration of trivalent and pentavalent arsenic in an arsenic-containing solution is thus contemplated.

In accordance with a process for reducing the concentration of pentavalent arsenic, a vessel, also referred to as a flow-permissive container such as a chromatographic column or mesh pouch is provided that contains a water-insoluble polymeric adsorption medium having a plurality of adsorption sites that are pyridyl-containing moieties present as polymerized 2- or 4-vinyl $C_1-C_4$ N-alkyl pyridinium moieties (shown below) and preferably as N-methyl pyridinium moieties. An influent of an aqueous solution containing objectionable levels (more than about 2 ppb) of pentavalent arsenic, also referred to herein as a load or challenge solution, is introduced to the vessel to contact the insoluble adsorption medium. That influent introduction can be carried out by pumping, gravity flow, or simple diffusion as is well known. The solution is maintained in contact with the insoluble adsorption medium for a period of time sufficient for the adsorption sites to bind to pentavalent arsenic in the influent solution to form medium-bound pentavalent arsenic and an aqueous composition that is essentially devoid of pentavalent arsenic. That aqueous composition is subsequently discharged from or flows out of the vessel as an effluent having a total pentavalent arsenic concentration less than about 2 ppb.

The arsenic-containing aqueous solution is typically provided from a ground or surface water source, such as a well. In a preferred process, the aqueous solution has an initial pentavalent arsenic concentration of more than about 50 parts per billion. Preferably, the effluent stream discharged from the vessel has a total pentavalent arsenic concentration of about zero to about 2 parts per billion.

A contemplated polymeric adsorption medium contains a plurality of adsorption sites that are polymerized pyridyl-containing moieties present as polymerized 2- or 4-vinyl $C_1$–$C_4$ N-alkyl pyridinium moieties and has the following schematic structure in which the polymeric backbone is represented as a "polymer."

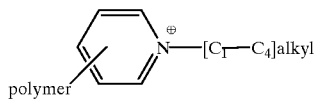

Use of polymerized 4-vinyl $C_1$–$C_4$ N-alkyl pyridinium moieties (groups) is preferred. Although $C_1$–$C_4$ alkyl groups such as methyl, ethyl, isopropyl, n-butyl, sec-butyl and the like can be present bonded to the nitrogen of the polymerized pyridinium moiety, N-methyl is a particularly preferred $C_1$–$C_4$ N-alkyl moiety.

A polymeric adsorption medium of the subject invention preferably contains at least about 10 mole percent of the polymerized monomers present as $C_1$–$C_4$ N-alkylated pyridinium moieties. Up to about 80 percent of the pyridyl groups can be alkylated, with use of an adsorption medium having about 60 to about 80 percent of the pyridyl nitrogens alkylated being preferred. Thus, the amount of $C_1$–$C_4$ N-alkylated pyridinium moieties can be about 10 to about 80 percent, and preferably about 60 to about 80 percent, of the polymeric absorption medium. Such an adsorption medium is available commercially and sold under the trademark of PERFIX™ (Ntec Solutions, Inc.) or Reillex HPQ (Reilly Industries, Inc.).

A contemplated adsorption medium is also insoluble in water. Such water-insolubility can be achieved by co-polymerizing the pyridyl-containing monomer with a cross-linking agent, and also by use of another co-monomer such as styrene or ethyl styrene, as are well known. Divinyl benzene is a preferred cross-linking agent, but other cross-linking agents can also be used as is also well known. The copolymer can then be N-alkylated for use herein.

Water-insoluble beaded and powdered copolymer pyridyl-containing adsorption media precursors such as 4-vinyl pyridine, divinyl benzene and ethyl styrene are commercially available from Reilly Industries, Inc. of Indianapolis, Ind. (Reilly). These media are sold as REILLEX™ 402 (powder; 4-vinyl pyridine, ethyl styrene, divinyl benzene), REILLEX™ 402-I (granules; components as above), REILLEX™ HP (beads; components as above) and REILLEX™ 425 (beads; components as above). The media also differ in anion exchange capacity [about 8.8 equivalents/kilogram (eq/kg) to about 4.4 eq/kg] and particle size. The pyridyl-containing adsorption media precursors can be N-alkylated with $C_1$ to $C_4$ alkyl halides using methods known in the art for use herein.

Adsorption media such as water-insoluble beaded copolymers of 4-vinyl pyridine, divinyl benzene and ethyl styrene having a preponderance of N-methylated pyridinium residues are commercially available from Reilly as REILLEX™ HPQ (an N-methylated version of REILLEX™ 425; total exchange capacity about 4.6 meq/g dry; i.e., strong and weak ion exchange capacity) and available from NTEC Solutions, Inc. (Mount Prospect, Ill., USA) as PERFIX™ adsorption medium. In these media, approximately 70 percent of the pyridyl residues are N-methylated (about 1–2 molar equivalents of N-methyl pyridinium ion per liter of medium). PERFIX™ adsorption medium is especially preferred for use here. Manufacture of a resin (adsorption medium) preferred for use in carrying out the present process is described in U.S. Pat. Nos. 4,221,871, 4,224,415, 4,256,840 and No. 4,382,124, which disclosures are incorporated herein by reference.

Should the aqueous influent stream contain objectionable levels of trivalent arsenic (greater than about 2.0 ppb), this invention provides a process for oxidizing the trivalent arsenic to pentavalent arsenic that can be removed from the stream.

A contemplated process for reducing the concentration of trivalent arsenic in an aqueous solution includes providing a vessel containing a water-insoluble oxidizing medium that is a reaction product of a $KI/I_2$ solution and polymerized 2- or 4-vinyl $C_1$–$C_4$ N-alkyl pyridinium moieties, preferably N-methyl pyridinium moieties, that form oxidizing sites. An influent of an aqueous solution having an initial total trivalent arsenic concentration of greater than about 2 parts per billion is introduced to the vessel to contact the insoluble oxidizing medium as discussed previously.

A contemplated oxidizing medium is provided in a vessel as described for the adsorption medium. The influent aqueous solution is maintained in contact with the insoluble oxidizing medium for a period of time sufficient for the essentially complete conversion of trivalent to pentavalent arsenic to occur, thereby reducing the trivalent arsenic concentration to the limits of detection. The resultant aqueous composition thus contains pentavalent arsenic that is derived as well as that originally present in (indigenous to) the influent.

The derived and indigenous pentavalent arsenic are removed from the aqueous stream by contacting with an insoluble adsorption medium, such as PERFIX™ (N-methyl pyridinium) resin, as described before.

The pentavalent arsenic can also bind to adsorption sites present in the oxidizing medium. In one embodiment, the oxidizing medium can be mixed together with the adsorption medium, thereby forming a mixed-bed medium capable of oxidizing trivalent arsenic and adsorbing pentavalent arsenic.

Preferably, the adsorption medium and oxidizing medium are provided in a serial manner such that fresh adsorption medium is provided to the aqueous composition "downstream" of the oxidation medium in the same or a second vessel. The oxidizing medium and adsorption medium can be provided in the same vessel in separate layers, for example such that the influent solution first encounters the oxidizing medium, followed by the adsorption medium. Alternatively, the aqueous composition containing pentavalent arsenic after contacting the oxidizing medium can be introduced into a second vessel containing adsorption medium.

A contemplated oxidizing medium can be made by reacting insoluble an N-alkylated adsorption medium, described above, with a potassium tri-iodide solution ($KI/I_2$) made by admixing commercially available potassium iodide and iodine solution (e.g. Aldrich Chemical Co., St. Louis, Mo.), as described in Example 5.

A preferred insoluble oxidizing medium of this invention is the reaction product of PERFIX™ (N-methyl pyridinium) resin and potassium tri-iodide ($KI/I_2$). The exact structure of this reaction product is not known but is thought to be a 1:1 complex of resident N-methyl pyridinium residues of the PERFIX™ (N-methyl pyridinium) resin and $I_3$.

The preferred insoluble oxidant of this invention is dark brown in color. Upon contact of the dark brown insoluble oxidant with trivalent arsenic-containing aqueous streams, the characteristic dark brown color is discharged, yielding a light tan medium that is the color of starting PERFIX™ (N-methyl pyridinium) resin. Thus, conversion of trivalent arsenic to pentavalent arsenic by the preferred insoluble oxidant of this invention is a self-indicating process.

In preferred practice, it is contemplated that contact between the arsenic-containing aqueous solution and the adsorption medium or oxidizing medium be carried out in a chromatographic column or flow-through container, such as a perforated plastic or mesh pouch containing adsorption particles, e.g., a "tea bag". As such, the media are preferably in the form of beads or particles. It is noted, however, that another physical form such as a liquid, powder, membrane, sheet or other web can also be utilized.

It should be apparent to those skilled in the art of water purification that a water-insoluble polymeric adsorption or oxidizing medium can be solid or liquid, as noted above. It should also be understood that the $C_1$–$C_4$ N-alkyl pyridinium-containing moieties need not themselves form part of a polymer backbone, but can also be grafted onto a previously made polymer, and then preferably N-alkylated to form an adsorption medium having $C_1$–$C_4$ N-alkyl pyridinium moiety adsorption sites. Thus, for example, a thiol-containing polymer can be reacted with 2- or 4-vinyl pyridine to form polymerized thioethylpyridine groups that can then be N-alkylated with methyl chloride or methyl iodide or the like to form a preferred adsorption or oxidizing medium.

Although other polymerized monomers can be present in a polymerized adsorption or oxidizing medium, such other monomers and the adsorption medium are free of other ionically charged functional groups. Non-alkylated polymerized 2- or 4-vinyl pyridine can be present, however, as is the case with a preferred polymerized adsorption or oxidizing medium.

Contact between the adsorption medium and the aqueous pentavalent arsenic-containing solution is maintained for a time period sufficient for the pentavalent arsenic to be bound by the N-alkyl pyridinium-containing adsorption sites of the medium. That binding is usually quite rapid, with contact times of a few seconds to a few minutes typically being utilized. Much longer contact times such as a few hours can be utilized with no ill effect being observed.

Contact between the oxidizing medium and the aqueous trivalent arsenic-containing solution is maintained for a time period sufficient for the tri-iodide to oxidize the trivalent arsenic to pentavalent arsenic. The reaction is rapid, and can be conveniently monitored by observation of the color change from the dark brown color of the tri-iodide complex to the light tan color of the spent N-alkylated oxidizing medium.

The contact time is conveniently controlled by changing the flow rate through the column or flow-permissive container. The time that the solution is maintained in contact with the adsorption or oxidizing medium is the "solution residence time".

The flow, temperature and pressure constraints of the process are dictated primarily by the limitations of the equipment utilized and the resin used in carrying out the invention. Ambient temperature and pressure are normally used.

An aqueous solution treated with adsorption medium is essentially depleted of pentavalent arsenic until the medium adsorption capacity is surpassed. Surpassing the medium adsorption capacity is indicated by analytical testing of the effluent. The presence of arsenic is conveniently ascertained using the well-known and commercially available Gutzeit Arsine Generation test. A column can be loaded with an aqueous arsenic-containing solution until an arsenic assay indicates that pentavalent arsenic is discharging from the medium.

Surprisingly, the binding efficiency of pentavalent arsenic to an adsorption resin of the invention is better than the arsenic binding efficiency of the ion exchange resins of the art. For example, PERFIX™ exhibited a greater than 99 percent pentavalent arsenic binding efficiency. In addition, substantially no binding was observed between pentavalent arsenic and an insoluble polyvinyl pyridine polymer that was free of N-alkyl groups.

Without intending to be bound by theory, it is believed that the binding efficiency of the resin for pentavalent arsenic arises from an interaction in addition to a standard anion-exchange ion-ion interaction. A direct interaction has been observed between the related element antimony and the pi-electron cloud of aromatic molecules, and it is postulated that a similar interaction contributes to the efficient binding observed with pentavalent arsenic.

Both the adsorption medium and the oxidizing medium can be regenerated by the well-known methods for regenerating anion exchange-type adsorption media. Typically, these mass action-based methods utilize a wash of the resin with a "stripping solution" of an intermediate concentration of a strong base (e.g. 1–4 N NaOH), preferably admixed with a salt to increase the ionic strength (e.g. 1–4 N NaCl) as a base/salt solution, followed by a neutralizing wash of the resin with a solution of an intermediate concentration of a strong acid with a monovalent anion (e.g. 1 N HCl). The stripping solution efficiently removes the bound pentavalent arsenic from the adsorption medium, so that the final volume of aqueous solution containing arsenic is relatively small, thereby reducing the costs of shipping, treating and handling the contaminated waste.

The adsorption medium can be prepared for re-use by re-equilibrating the adsorption medium with arsenic-free water. The oxidizing medium can be prepared for re-use by re-equilibrating the medium with $KI/I_2$ solution. Regeneration of the adsorption medium and of the oxidizing medium are preferably accomplished without removing either medium from its own vessel.

It was observed that the adsorption medium could be repeatedly regenerated (e.g., stripped), rinsed and reused without noticeable physical or chemical degradation of the pentavalent arsenic binding capacity of the resin. The PERFIX™ (N-methyl pyridinium) resin that was used can withstand operational pressures of 100 psi and temperatures of 100 degrees Celsius. Generally, increases in back pressure indicate physical degradation of the adsorption medium.

A contemplated pentavalent arsenic adsorption process successfully removes pentavalent arsenic from arsenic-contaminated aqueous solutions at temperatures between about 15° C. and 90° C. Preferably, the process is operated at temperatures between about 20° C. and 70° C.

A contemplated trivalent arsenic oxidizing process successfully oxidizes trivalent arsenic in arsenic-contaminated aqueous solutions at temperatures between about 15° C. and 90° C. Preferably, the process is operated at temperatures between about 20° C. and 70° C.

The present pentavalent arsenic adsorption process successfully removes pentavalent arsenic from an aqueous solution in a pH range from acidic to about neutral (about pH 1 to about pH 7). Preferably, the process is operated with a solution having a pH value between about 4 and 7, and most preferably, between about 6 and 7. At pH values above about 7, the process begins to lose efficiency and at a pH value of about 14 (e.g., addition of 2.0 N NaOH), the pentavalent arsenic binding to the adsorption medium is much less efficient.

The process effectively reduces arsenic contaminants from aqueous solutions having initial pentavalent arsenic concentrations of greater than about 2 ppb, and has been observed to reduce the pentavalent arsenic concentrations thereof to less than about 2 ppb, and more particularly down to concentrations between about zero and 2 ppb.

EXAMPLE 1

Removal of Pentavalent Arsenic From an Aqueous Stream

Reillex HPQ resin as received from the manufacturer (Reilly Industries, Indianapolis, Ind.) contains approximately 3.4 meq per gram of N-methylpyridine function together with approximately 1.2 meq per gram of pyridine function; both groups are integrated into the backbone of the resin, said incorporation arising from co-polymerization of vinyl pyridine monomer followed by N-alkylation using an alkyl halide. Reillex HPQ resin is cross-linked using divinyl benzene which yields rigid, porous, spherical particles of 18–50 mesh size. Prior to use in this Example, the resin (one volume) is slurried by stirring with deionized water (two to three volumes) in a suitably sized container such as a beaker. Stirring is stopped and the resin is allowed to settle to the bottom of the container. Finer particles (fines) are undesirable during column operation since they impede flow. Because fines do not settle as quickly as the 18–50 mesh size particles, they are conveniently removed by decantation of supernatant water/fines from the unstirred slurry. This operation is repeated two or three additional cycles or until no visual evidence of fines is noticed upon slurry, settle and decant operations.

The de-fined resin (one volume) is then sequentially slurried, settled and decanted from two volumes each of 2.0 N NaOH, deionized water, 10 percent v/v acetic acid and finally deionized water. Deionized water is added to the conditioned resin until an approximately 50 percent v/v resin water mixture is obtained. Alternatively, PERFIX™ (N-methyl pyridinium) resin from Ntec Solutions, Inc. can be used directly because it is supplied as a defined and conditioned resin.

The 50 percent slurry of conditioned resin is poured into a 50 cm×2.5 cm laboratory column equipped with a bottom, coarse, bottom retention frit and a bottom stopcock by which to control flow through the column. Resin slurry is added to the top of the column until 100 mL of settled resin bed are obtained (water is permitted to flow through the bottom stopcock in order to accommodate the desired volume of settled resin).

A concentrated (1000 ppm) pentavalent arsenic standard is prepared by dissolving 4.167 gm of $Na_2HAsO_4 \cdot 7H_2O$ in 1.0 liter of deionized water and adjusting the pH value of the resulting solution to pH 6–7 by cautious, drop-wise addition of concentrated hydrochloric acid while monitoring the resulting pH after each drop with a pH meter or pH color strips. The 1000 ppm pentavalent arsenic standard was diluted to a 100 ppm pentavalent arsenic standard by mixing one volume of the 1000 ppm standard with nine volumes of deionized water. The 100 ppm standard was prepared as needed for challenging the resin column.

The capacity of the 100 mL volume of N-methyl pyridinium resin for pentavalent arsenic was established by addition of 100 ppm prepared pentavalent arsenic standard while the flow was maintained at 10–20 mL per minute through the bottom stopcock. Pentavalent arsenic standard flowing through the resin bed and out of the column (effluent) was collected in 100 mL (1 column volume) fractions which were collected and held for arsenic analysis. Periodic analysis (after every 10 column volumes) of effluent for pentavalent arsenic were made by a commercially available Gutzeit Arsine Generation test. This test for arsenic can detect slightly less than 0.100 parts per million of either trivalent or pentavalent arsenic (an arsenic detection limit of about 0.5 ppb can be obtained with other well-known methods and equipment). Influent challenge of the resin was continued until 0.100 ppm of arsenic were detected exiting the column as effluent.

In this manner, it was established that greater than 99.9 percent of the arsenic in slightly more than 120 bed volumes (12 liters of 100 ppm pentavalent arsenic standard or 1200 mg of pentavalent arsenic) was bound by the 100 mL bed volume of PERFIX™ (N-methyl pyridinium) resin. The challenge of pentavalent arsenic at a 100 ppm level represents a one thousand-fold greater challenge than well water containing 100 parts per billion. Thus, the PERFIX™ (N-methyl pyridinium) resin as used in this Example exhibited a capacity of in excess of 120,000 column volumes at a greater than 99 percent pentavalent arsenic capture efficiency when challenged by an aqueous stream of 100 ppb. This capacity is more than two orders of magnitude greater than classical ion exchange resins described in the prior art.

EXAMPLE 2

Stripping of Bound Pentavalent Arsenic and Regeneration of PERFIX™ (N-methyl Pyridinium) Resin For Reuse To the arsenic-saturated column described in Example 1, 100 mL (1 column volume) of a stripping solution comprised of 2 N NAOH and 2 N NaCl was flowed into and through the column, collected dropwise at a rate of approximately 10 mL/min and saved as stripping effluent for analysis. A second column volume (CV) of stripping solution was applied and collected in the same manner. During the application of the stripping solution, the resin changed color from a light tan to a dark brown. By serially diluting each stripping effluent until the Gutzeit test for arsenic fell within the analytical working range for the test (0.100 to 3.0 ppm), it was determined that greater 95–99 percent of the originally bound pentavalent arsenic (1200 mg) was eluted with two column volumes of stripping solution.

The resin was then washed with 2 column volumes of water followed by 2 column volumes of 10 percent acetic acid (whereupon the color of the PERFIX™ (N-methyl pyridinium) resin reverted to light tan) followed by 2 column volumes of water. The final washes were checked and found to be negative (<0.100 ppm) for the presence of arsenic. The resin after washing was considered reconditioned and ready for reuse (see Example 3).

The surprisingly high binding capacity, high binding efficiency and high stripping efficiency combine to result in high concentration factors for the process. "Concentration factor" can be defined as the ratio of the volume of arsenic-containing water introduced and depleted of arsenic to the volume of stripping eluate. Thus, in this Example and the preceding Example, 12 liters of 100 ppm arsenic solution were concentrated to 200 mL for a concentration factor of 60. A more typical water challenge of 100 ppb of arsenic would result in a concentration factor of 60,000.

The ability to concentrate a toxic metal in this manner offers considerable savings, flexibility and ease of operation in terms of the ultimate, environmentally sound disposal method used. For example, neutralization of the stripped effluent followed by evaporation becomes a viable option to further reduce the toxic waste volume prior to disposal. This procedure would not be a viable option using classical ion exchange resins of the prior art because the stripping effluent from such systems would be so dilute in arsenic that it would present a prodigious task to evaporate such an effluent prior to disposal.

In the practice of removing arsenic from drinking water, even with the highly efficient method described by the instant invention, it is neither practical nor prudent to run a column system up to and beyond saturation. Avoidance of ingesting toxic arsenic beyond the proposed 2 ppb MCL requires that a liberal margin of safety be maintained during the arsenic removal process. It is contemplated that even very efficient and high capacity adsorption processes disclosed by this invention should not be extended beyond 50–75 percent of the established capacity of the system.

Thus, the shortcomings of processes for arsenic removal described by the prior art are further exacerbated by demands imposed by prudent safety margins. Stripping and reconditioning resin columns that are not saturated with arsenic necessarily reduces the concentration factor by a percentage equal to the amount of column utilization. By use of a contemplated process, it is neither difficult nor cost prohibitive to collect the concentrated stripping eluate from an under-utilized field column, adjust the pH to 6–7 using acetic or hydrochloric acid and reapply the pH-adjusted stripping eluate to another PERFIX™ column not intended for the production of potable water and to challenge that column until saturation for the purpose of waste concentration.

In summary, this Example demonstrates that the N-methyl pyridinium resin of this invention can be stripped and reconditioned for reuse using an "on column" protocol. The small volume of stripping solution utilized for essentially complete removal of bound arsenic results in a high concentration factor. The stripping eluate of this Example contains up to 6 grams of arsenic per liter. This concentrated form of arsenic waste provides a practical material for secondary treatment methods en route to ultimate, environmentally sound disposal choices.

EXAMPLE 3
Reuse of Stripped, Reconditioned PERFIX™ (N-Methyl Pyridinium Resin)

Pentavalent arsenic standard (100 ppm) was prepared per Example 1 and reapplied to the stripped and reconditioned N-methyl pyridinium resin column (100 mL PERFIX™ resin) from Example 2. Pentavalent arsenic challenge (100 ppm) to the column was continued until arsenic (>0.100 ppm) was detected in the column effluent. The capacity for pentavalent arsenic of the stripped and reconditioned column was 150 column volumes or 15 grams as arsenic per liter of resin. This result is somewhat higher than the capacity revealed in Example 1 (12 grams as arsenic per liter of resin). It is believed that the resin bed was settled to a greater extent in this Example leading to enhanced chromatographic performance. This Example demonstrates that PERFIX™ (N-methyl pyridinium) resin (N-methyl pyridinium) can be stripped, reconditioned and reused multiple times without loss of performance.

EXAMPLE 4
Capacity of PERFIX™ (N-methyl pyridinium) Resin For Trivalent Arsenic

Fresh PERFIX™ (N-methyl pyridinium) resin (100 mL) was prepared and charged to a chromatographic column as described in Example 1. A 1000 ppm standard of trivalent arsenic was prepared by dissolving 1.7359 grams of $NaAsO_2$ (MW 129.9) in one liter of deionized water and adjusting the pH value of the resulting solution to 6–7 using concentrated hydrochloric acid as described in Example 1. This standard was further diluted by mixing 1 part by volume of the 1000 ppm trivalent arsenic standard with 9 parts by volume of deionized water. The 100 ppm trivalent arsenic standard was then used to challenge the column containing the 100 mL of fresh PERFIX™ (N-methyl pyridinium) resin at a flow rate of 10 mL/min.

Analysis of the effluent by the Gutzeit arsine generation assay revealed that less than one column volume (<100 mL) of the challenge solution had passed through the column before a strong positive test for arsenic was detected. The challenge of 100 ppm trivalent arsenic standard was discontinued and the column and resin were washed with deionized water until no arsenic was detected in the column effluent (approximately 3 column volumes of wash). This Example demonstrates that the N-methyl pyridinium resin (PERFIX™) has virtually no direct binding capacity for trivalent arsenic.

EXAMPLE 5
Preparation of PERFIX™-$I_3$_Complex; an Insoluble Resin For On-Column, On-Demand Oxidation of Trivalent Arsenic to Pentavalent Arsenic N-Methyl pyridinium resin (450 mL) as conditioned in Example 1 was placed in a 4 liter beaker and slurried with approximately one liter of deionized water at room temperature by means of an overhead stirrer. A total of 450 mL of 1 N N $KI/I_2$ solution (KI and 1 N $I_2$ solution, also called $KI_3$ solution or potassium tri-iodide solution, from Aldrich Chemical Co. Milwaukee, Wis.) were added to the continuously stirred resin slurry. The dark brown $KI/I_2$ solution was added in 100 mL increments, which resulted in an initial dark brown color of the supernatant water followed by uptake by the resin of the 3- complex causing the supernatant to become nearly colorless and the resin to change in color from light tan to dark brown. The final additions of $KI/I_2$ solution required a longer period of time to be adsorbed by the resin as judged by the rate of color depletion of the supernatant.

Stirring was continued for 30 minutes after the final addition of 1 N $KI/I_2$ solution. At the end of this time, the resin was filtered by means of a porous glass funnel and sequentially slurried, washed and filtered with 5×1 liters of deionized water. The dark brown resin obtained was finally slurried and poured into a one liter plastic bottle as a 50 percent slurry with water for storage until subsequent use.

The prepared resin product could be stored at room temperature for many weeks without decomposition or loss of oxidizing power. Owing to the dark brown color of the resin product formed in the foregoing manipulations, it is believed that the iodine associated with the N-methyl pyridinium resin is present as $I_3^-$, which is held as a very stable complex by the quaternary nitrogen of the pyridine ring of PERFIX™ (N-methyl pyridinium) resin. In contrast, 1 N $I_2$ solution from Aldrich Chemical Co. mixed with Reillex® HP polymer, that contains pyridine residues that have not been alkylated, forms a red-orange color with this resin. The reaction product with Reillex® HP resin is believed to be a resin-$I_2$ complex.

It will be recognized by those with ordinary skill in the art that the PERFIX™-$I_3^-$ (N-methyl pyridinium) resin-$I_3^{31}$ product prepared above can be loaded with $I_3^-$ to varying levels. The ratio of 1.0 equivalent of $I_3^-$ to 1.0 liters of N-methyl pyridinium containing resin (PERFIX-$I_3^-$) is purely a matter of choice but is felt to offer a proper balance of high oxidizing ability balanced with stability and cost of product. Other loading ratios are also useful for exploiting the on-demand oxidizing ability of PERFIX™-$I_3^-$ (N-methyl pyridinium-$I_3^-$) as described in Example 6.

EXAMPLE 6
Use of Insoluble Oxidizing Resin and PERFIX™ in Combination to Remove Trivalent Arsenic From Aqueous Streams To the top of the column loaded PERFIX™ (N-methyl pyridinium) resin used in Example 4 (which showed no capacity for trivalent arsenic) were added 40 mL of the dark brown PERFIX-$I_3^-$ (N-methyl pyridinium-$I_3^-$) resin as a 50 percent slurry as prepared in Example 5. This resulted in a single, segmented column showing distinctly different colored bands (dark brown on top, light tan on bottom) a "mixed bed".

Example 4 was then repeated, challenging the segmented resin column with 100 ppm trivalent arsenic standard at a flow rate of approximately 10 mL per hour and at ambient temperature (approximately 18 degrees centigrade). Arsenic levels were checked in the column effluent after every 100 mL had passed through the column (100/140 of a column volume). No arsenic was detected in the effluent after 600 mL of trivalent arsenic standard had been offered to the column.

During the time of trivalent arsenic challenge, the top portion (approximately 1 mm band height) of the dark brown PERFIX™-$I_3^-$ (N-methyl pyridinium $I_3^-$) resin reverted to a light tan color indicating that the $I_3^-$ portion of the resin had reacted with the incoming trivalent arsenic load and further demonstrating that PERFIX™-$I_3^-$ (N-methyl pyridinium-$I_3^-$) has a self-indicating quality. This study was terminated prior to exhaustion of either resin contained in the column.

This Example demonstrates that trivalent arsenic in aqueous streams is completely oxidized to pentavalent arsenic by brief contact with the PERFIX™-$I_3^-$ (N-methyl pyridinium-$I_3^-$) resin and that the pentavalent arsenic thus produced is in turn depleted from the aqueous stream by the PERFIX™ (N-methyl pyridinium) resin in the lower portion of the segmented column in exactly the same manner as described in Example 1. Because the oxidizing ability of the PERFIX™-$I_3^-$ (N-methyl pyridinium-$I_3^-$) resin is used on demand and the self-indicating quality of the adsorption resin is used, there exists no onus on the part of the user to determine with precision the exact amount of PERFIX™-$I_3^-$ (N-methyl pyridinium-$I_3^-$) to utilize or the exact level of trivalent arsenic present in the challenge stream. As long as the PERFIX™-$I_3^-$ (N-methyl pyridinium-$I_3^-$) product is dark brown, there remains sufficient oxidizing ability to accommodate more trivalent arsenic challenge.

It will be recognized by those with ordinary skill in the art that the rapid conversion of trivalent to pentavalent arsenic brought about by the PERFIX™-$I_3^-$ (N-methyl pyridinium-$I_3^-$) complex suggests that this composition can be used in a stirred, batch format (loose particles or "tea bag") or in a separate, dedicated column containing only PERFIX™-$I_3^-$ (N-methyl pyridinium-$I_3^-$) resin. It is advantageous to accommodate the PERFIX™-$I_3^-$ (N-methyl pyridinium-$I_3^-$) resin in a "see-through" column or other configuration in order to take advantage of the self-indicating quality of this composition.

EXAMPLE 7
Use of PERFIX™ (N-methyl pyridinium) Column to Remove Arsenic from a New Hampshire Well Water Sample It is recognized by those with skill in the art of water purification that actual samples from "field" sites can present a unique challenge for proper remediation of a target contaminant due to other competing dissolved species; often of an unknown quality or quantity. With arsenic, the problem can be particularly vexatious due to varying quantities of trivalent and pentavalent forms of this metal. In order to demonstrate the utility of the instant invention with respect to an actual field challenge of arsenic-contaminated well water as opposed to a synthetic laboratory challenge, a sample of well water from a private, New Hampshire source was evaluated.

No pre-treatment of the New Hampshire well water was made. Analysis of this sample by instrumental techniques by an independent laboratory (Environmental Health Laboratories, South Bend, Ind.) revealed a total arsenic level of 370 micrograms per liter (370 ppb). The relative concentrations of trivalent and pentavalent arsenic are unknown. The level of arsenic in this well which serves a portion of the water requirements of a private residence in New Hampshire is well above the current MCL of 50 ppb and nearly two hundred times the proposed MCL of 2.0 ppb.

Using the same column as described in Examples 1, 2 and 3 with stripped and reconditioned N-methyl pyridinium PERFIX™ (N-methyl pyridinium) resin, 500 mL (5 column volumes) of the well water sample was passed through the column in order to displace the void volume of water present in the column and resin. This initial sample was discarded. An additional liter of the well water was passed through the column, collected and sent for independent, instrumental analysis with an arsenic detection limit on the order of 0.5 ppb.

As stated above, pre-column well water contained 370 ppb, post column well water was found to still contain 13.0 ppb (a 96 percent removal efficiency of arsenic). Recall that other Examples herein using pentavalent arsenic laboratory standards, consistently revealed an arsenic removal efficiency of greater than 99 percent. Additionally, while the prior art considers a 96 percent arsenic removal efficiency as acceptable, the residual level of 13 ppb arsenic resulting in this Example exceeds the proposed EPA MCL of 2.0 ppb.

It is believed that a majority, if not all of the 13 ppb residual level of arsenic remaining after PERFIX™ (N-methyl pyridinium) resin chromatography is trivalent arsenic that was shown in Example 4 not to have any binding ability with PERFIX™ (N-methyl pyridinium) resin. Example 8 below substantiates this hypothesis.

It was also noticed that the New Hampshire well water sample had a light scattering (Tyndall) property prior to column chromatography with the PERFIX™ (N-methyl pyridinium) resin. It is not known whether the light scattering quality of the water is a consequence of the arsenic contamination. Surprisingly, the effluent water had a greatly improved visual quality in that it was sparkling clear and revealed no light scattering.

EXAMPLE 8
Use of Insoluble Oxidizing Resin and N-methyl pyridinium to Remove Arsenic from a New Hampshire Well Water Sample To the resin contained in the column used in Example 7 was added approximately 25 mL of PERFIX™-$I_3^-$ (N-methyl pyridinium-$I_3^-$) complex as prepared in Example 5 as a 50 percent slurry in deionized water. As in Example 7, 500 mL (5 column volumes) of the New Hampshire well water were passed through the segmented column containing the PERFIX™ (N-methyl pyridinium) resin and the PERFIX™-$I_3^-$ (N-methyl pyridinium-$I_3^-$) complex. This initial effluent was collected and then discarded.

An additional liter of the well water sample was passed through the segmented resin bed, collected as effluent and sent for independent instrumental analysis. As before, the untreated well water sample revealed a total arsenic content of approximately 370 ppb. The effluent, after a short pass through PERFIX™$I_3^-$ (N-methyl pyridinium-$I_3^-$) complex followed by PERFIX™ now revealed a total arsenic content of 1.6 ppb. This confirms that the residual arsenic level of 13 ppb remaining in Example 7 was largely trivalent and that the addition of PERFIX™-$I_3^-$ (N-methyl pyridinium-$I_3^-$) complex column treatment step oxidized this form of arsenic to pentavalent arsenic which was taken up by the PERFIX™ (N-methyl pyridinium) resin previously loaded in the bottom portion of the column.

This Example also demonstrates that a process of the invention provides water meeting the proposed MCL of 2.0 ppb. The improvement in the visual quality of the well water noted in Example 7 was realized in this Example.

From the foregoing, it will be observed that numerous modifications and variations can be effectuated without departing from the true spirit and scope of the novel concepts of the present invention. It is to be understood that no limitation with respect to the specific examples presented is intended or should be inferred. The disclosure is intended to cover by the appended claims all such modifications as fall within the scope of the claims.

We claim:

1. A process for removing pentavalent arsenic from an aqueous solution comprising the steps of:
   (a) providing a vessel containing a water-insoluble polymeric adsorption medium having a plurality of adsorption sites that are pyridyl-containing moieties present as polymerized $C_1$–$C_4$ N-alkyl pyridinium moieties;
   (b) introducing an influent aqueous solution having an initial pentavalent arsenic concentration greater than about 2 parts per billion to the vessel to contact the insoluble adsorption medium;
   (c) maintaining said solution in contact with said insoluble adsorption medium for a time period sufficient for said pentavalent arsenic in the influent to bind to said adsorption sites to form a medium-bound arsenic and an aqueous composition; and
   (d) discharging the aqueous composition from the vessel as an effluent having final pentavalent arsenic concentration of about zero to about 2 parts per billion.

2. The process in accordance with claim 1 wherein the influent has an initial pentavalent arsenic concentration greater than 50 parts per billion.

3. The process in accordance with claim 1 wherein said polymerized $C_1$–$C_4$ N-alkyl pyridinium moieties constitute about 10 to about 80 mole percent of the polymeric adsorption medium.

4. The process in accordance with claim 3 wherein said polymerized $C_1$–$C_4$ N-alkyl pyridinium moieties constitute about 60 to about 80 mole percent of the polymeric adsorption medium.

5. The process in accordance with claim 1 wherein said $C_1$–$C_4$ N-alkyl pyridinium moieties of said polymeric absorption medium are N-methyl pyridinium moieties.

6. The process in accordance with claim 1 including the further steps of:
   (e) removing arsenic from said polymeric adsorption medium by contacting said medium with an aqueous solution of a strong base, maintaining said contact for a time period sufficient to form an arsenic-containing aqueous stripping solution; and
   (f) recovering said arsenic-containing aqueous stripping solution.

7. A process for removing pentavalent arsenic from an aqueous solution comprising the steps of:
   (a) providing a vessel containing a water-insoluble polymeric adsorption medium having about 10 to about 80 mole percent polymerized $C_1$–$C_4$ N-alkyl pyridinium moieties as adsorption sites;
   (b) introducing an influent of an aqueous solution contaminated with pentavalent arsenic having an initial pentavalent arsenic concentration of more than about 2 parts per billion to the vessel to contact the adsorption sites;
   (c) maintaining said solution in contact with said adsorption medium for a time period sufficient for said adsorption sites to bind the pentavalent arsenic in the influent to form medium-bound arsenic and an aqueous composition; and
   (d) discharging said aqueous composition from the vessel as an effluent having a final arsenic concentration of about zero to about 2 parts per 20 billion.

8. A process for oxidizing trivalent arsenic to pentavalent arsenic comprising the steps of:
   (a) providing a vessel containing a water-insoluble polymeric oxidizing medium having a plurality of oxidizing sites that are the reaction products of pyridyl-containing moieties present as polymerized $C_1$–$C_4$ N-alkyl pyridinium moieties and a $KI/I_2$ solution;
   (b) introducing an influent aqueous solution having trivalent arsenic to the vessel to contact the insoluble oxidizing medium; and
   (c) maintaining said solution in contact with said insoluble medium for a time period sufficient for said trivalent arsenic in the influent to react with said oxidizing sites to form pentavalent arsenic.

9. A process for removing trivalent arsenic from an aqueous solution comprising the steps of:
   (a) providing a vessel containing a water-insoluble polymeric oxidizing medium having a plurality of oxidizing sites that are the reaction products of pyridyl-containing moieties present as polymerized $C_1$–$C_4$ N-alkyl pyridinium moieties and a $KI/I_2$ solution;
   (b) introducing an influent aqueous solution having trivalent arsenic to the vessel to contact the insoluble oxidizing medium;
   (c) maintaining said solution in contact with said insoluble medium for a time period sufficient for said trivalent arsenic in the influent to react with said oxidizing sites to form pentavalent arsenic in an influent pentavalent arsenic-containing aqueous solution;
   (d) providing a vessel containing a water-insoluble polymeric adsorption medium having a plurality of adsorption sites that are pyridyl-containing moieties present as polymerized $C_1$–$C_4$ N-alkyl pyridinium moieties;
   (e) introducing an influent pentavalent arsenic-containing aqueous solution having an initial pentavalent arsenic concentration greater than about 2 parts per billion to the vessel to contact the insoluble adsorption medium;
   (f) maintaining said solution in contact with said insoluble adsorption medium for a time period sufficient for said pentavalent arsenic in the influent to bind to said adsorption sites to form a medium-bound arsenic and an aqueous composition; and
   (g) discharging the aqueous composition from the vessel as an effluent having final trivalent and pentavalent arsenic concentrations of about zero to about 2 parts per billion.

* * * * *